United States Patent [19]

Hasegawa

[11] Patent Number: 4,967,133
[45] Date of Patent: Oct. 30, 1990

[54] MOTOR CONTROL APPARATUS
[75] Inventor: Hiroshi Hasegawa, Hirakata, Japan
[73] Assignee: Matsushita Electric Industrial Co., Ltd., Kadoma, Japan
[21] Appl. No.: 254,653
[22] PCT Filed: Dec. 23, 1987
[86] PCT No.: PCT/JP87/01019
§ 371 Date: Oct. 25, 1988
§ 102(e) Date: Oct. 25, 1988
[87] PCT Pub. No.: WO88/05225
PCT Pub. Date: Jul. 14, 1988
[30] Foreign Application Priority Data
Dec. 26, 1986 [JP] Japan .................. 61-312126
[51] Int. Cl.$^5$ .............................................. H02P 5/40
[52] U.S. Cl. ..................... 318/798; 318/806; 318/759
[58] Field of Search ............... 318/798, 806, 759–762; 361/26, 30–32; 363/57, 58

[56] References Cited
U.S. PATENT DOCUMENTS

| | | | |
|---|---|---|---|
| 3,800,198 | 3/1974 | Graf et al. ........................... | 318/806 |
| 3,887,860 | 6/1975 | Bernhardt et al. ................... | 363/57 |
| 3,947,748 | 3/1976 | Klein .................................. | 363/57 |
| 4,183,081 | 1/1980 | Cutler et al. ........................ | 363/58 |
| 4,234,917 | 11/1980 | Suzuki et al. ....................... | 363/57 |
| 4,545,464 | 10/1985 | Nomura ............................. | 318/762 |
| 4,667,776 | 5/1987 | Nomura ............................. | 318/759 |

FOREIGN PATENT DOCUMENTS
61-189178  8/1986  Japan .

Primary Examiner—David Smith, Jr.
Attorney, Agent, or Firm—Cushman, Darby & Cushman

[57] ABSTRACT

The present invention relates to a motor control apparatus having a discharge circuit 7 for reducing a voltage which is regenerated from motor 5 to the driving circuit 4 in the braking of an AC servomotor or the like, a protection circuit 8 for protecting the discharge circuit 7, and a voltage-drop detection circuit 20 for making the driving circuit stop after an activation of the protection circuit 8. The motor control apparatus contains a detection circuit 16, which detects a voltage of the smoothing capacitor 3 which is connected to the input terminal of the driving circuit 4 via the protection circuit 8 which is connected in series to the discharge circuit 7, and a voltage-drop detection circuit 20 which stops the driving circuit 4 after activation of the protection circuit 8.

2 Claims, 4 Drawing Sheets

Start of braking     End of braking

Start of braking
End of braking
Operation of protection circuit

List of reference numerals of drawings

1 ..... Alternating current power source
    2 ..... Rectifier diode
    3 ..... Smoothing capacitor
    4 ..... Driving circuit
    5 ..... Servomotor
    7 ..... Discharge circuit
    8 ..... Protection circuit
   16 ..... Regenerative voltage detection circuit
   19 ..... Over-voltage detection circuit
   20 ..... Voltage drop prevention (sic) circuit

MOTOR CONTROL APPARATUS

TECHNICAL FIELD

The present invention relates to a motor control apparatus comprising a discharge circuit for reducing a voltage which is regenerated to a driving circuit from a motor in the braking of an AC servomotor or the like, a protection circuit for protecting the discharge circuit, and means to render the driving circuit to an inoperative state after activation of the protection circuit.

BACKGROUND ART

Generally, in an AC servomotor, when reverse revolution braking (sic) is applied to the motor, a voltage is regenerated from the motor to a driving circuit, and the voltage on a smoothing capacitor provided on an input of the driving circuit rises, and sometimes the voltage exceeds the rated voltage of the capacitor.

Therefore, a method wherein, when the voltage of the smoothing capacitor rises, the voltage is detected and is discharged to a discharge circuit and the voltage rise of the smoothing capacitor is restricted, is known.

Hereafter, referring to the drawings, a conventional motor control apparatus is elucidated.

FIG. 1 shows a configuration of the conventional motor control apparatus. Referring to FIG. 1, numeral 1 designates an alternating current power source, numeral 2 designates a rectifier diode, numeral 3 designates a smoothing capacitor for smoothing an output of the rectifier diode 2, numeral 4 designates a motor driving circuit wherein a terminal voltage of the smoothing capacitor 3 is inputted, numeral 5 designates a servomotor which is driven by an output of the motor driving circuit 4, numeral 6 designates a regenerative voltage detection circuit which is connected to the input of the driving circuit 4, numeral 7 designates a discharge circuit of the smoothing capacitor 3, numeral 8 designates a protection circuit of the discharge circuit 7, numeral 9 designates an overvoltage detection circuit for stopping operation of the motor driving circuit 4 when an input of the motor driving circuit 4 exceeds a predetermined level, numeral 10 designates a voltage drop detection circuit for stopping operation of the motor driving circuit 4 when the input of the motor driving circuit 4 is lowered below a predetermined level during the operative state of the motor driving circuit 4.

Operation of the motor control circuit is hereafter described in more detail.

FIG. 2 shows voltage detecting levels Va, Vb, Vc of the regenerative voltage detection circuit 6, the overvoltage detection circuit 9 and the voltage drop detection circuit 10, respectively. In the same figure, $V_{DC}$ designates a terminal voltage of the smoothing capacitor 3.

When the motor turns into a braking state, $V_{DC}$ rises gradually, and when $V_{DC} > Va$ is attained, the regenerative voltage detection circuit 6 is activated, and the discharge circuit 7 is connected to the smoothing capacitor 3, and thereby the electric charge stored in the smoothing capacitor 3 is discharged through the discharge circuit 7, and $V_{DC}$ is reduced and returns to a steadystate. When $V_{DC} > Vb$ is attained by an instantaneous voltage rise, the over-voltage detection circuit 9 is activated, and the driving circuit 4 is caused to suspend operation and $V_{DC}$ is reduced. Even if the voltage of the smoothing capacitor 3 has become $V_{DC} < Vc$ while starting of the motor 5, the voltage drop detection circuit 10 stops the driving circuit 4 and serves to prevent drop of the voltage of the smoothing capacitor 3 under a set value.

Hereupon in the conventional apparatus, when the discharge circuit 7 is operated during a long time period, there is a danger of burning out the discharge circuit, and hence the protection circuit 8 for protecting the discharge circuit 7 works, and input to the discharge circuit 7 is intercepted; but there has been a disadvantage that the driving circuit 4 is operational in this state, and a voltage is regenerated from the motor to the driving circuit 4, and thereafter the voltage rise of the smoothing capacitor 3 can not be restricted if the voltage of the smoothing capacitor 3 did not rise until it becomes $V_{DC} > Vb$.

DISCLOSURE OF INVENTION

In the present invention, a regenerative voltage detection circuit for detecting a voltage of the smoothing capacitor via a low impedance protection circuit which is connected in series to the discharge circuit and the voltage drop detection circuit are provided, and after operation of the protection circuit, the driving circuit is made to a stopped state and safety is improved.

BEST MODE FOR CARRYING OUT THE INVENTION

Figure 1:
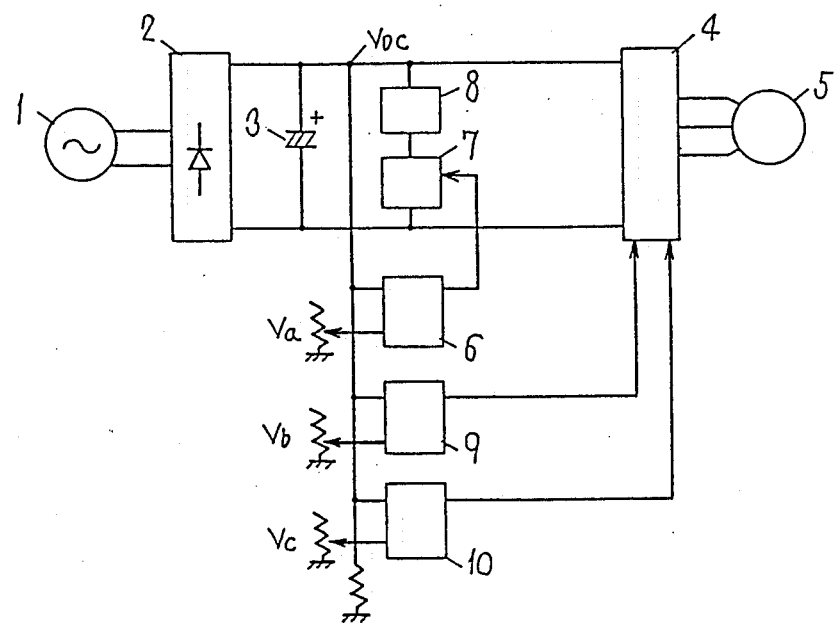
FIG. 1 is a block diagram of the conventional motor control apparatus.
Figure 2:
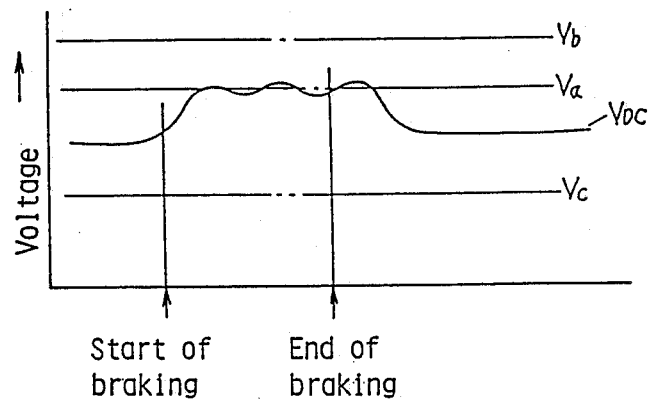
FIG. 2 is an operation explanatory drawing of a control apparatus as shown in FIG. 1.

Hereafter a motor control apparatus of an embodiment of the present invention is elucidated referring to the drawings.

Figure 3:
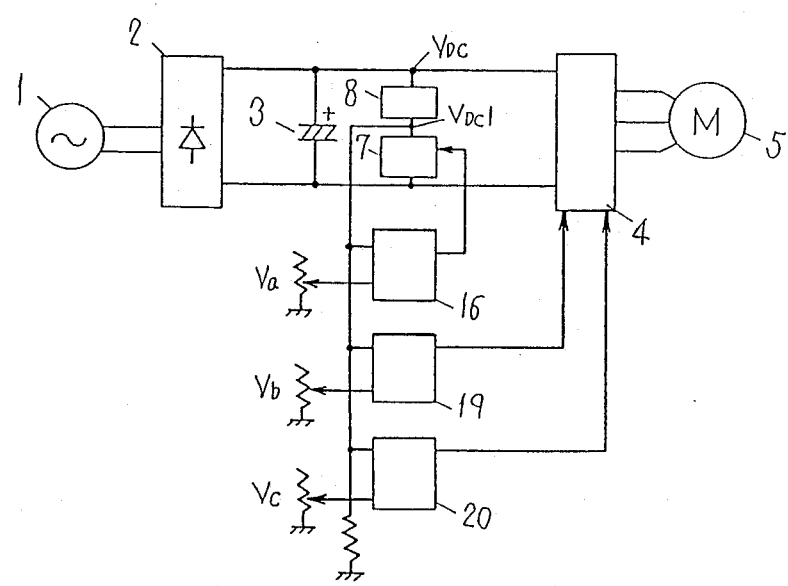
FIG. 3 is a block diagram of a motor control apparatus in an embodiment of the present invention.

FIG. 3 shows a configuration of the motor control apparatus in the embodiment of the present invention. Referring to FIG. 3, numeral 1 designates an alternating current power source, numeral 2 designates a rectifier diode, numeral 3 designates a smoothing capacitor, numeral 4 designates a motor driving circuit, numeral 5 designates a servomotor, numeral 7 designates a discharge circuit of a low impedance, numeral 8 designates a protection circuit of the discharge circuit 7 which is composed of a thermal fuse or the like, numeral 16 designates a regenerative voltage detection circuit which detects a voltage of the driving circuit 4 via the protection circuit 8 and connects the discharge circuit 7 to the smoothing capacitor 3 when the voltage exceeds a predetermined value, numeral 19 designates an overvoltage detection circuit which detects an over-voltage of an input of the driving circuit 4 and stops the operation of the driving circuit 4, and numeral 20 designates a voltage drop detection circuit which stops the operation of the driving circuit 4 when the input of the driving circuit 4 is lower than a predetermined level.

Figure 4:
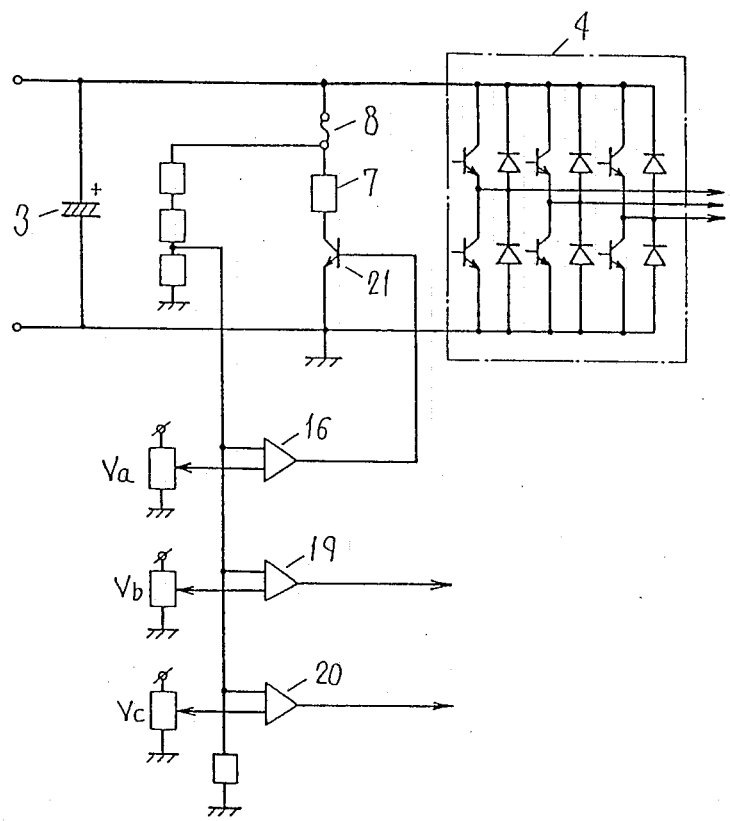
FIG. 4 is a circuitry showing a construction of the main portion of the control apparatus as shown in FIG. 3.

In the motor driving circuit which is constructed as mentioned above, the operation is elucidated by using the concrete circuitry of FIG. 4.

Figure 5:
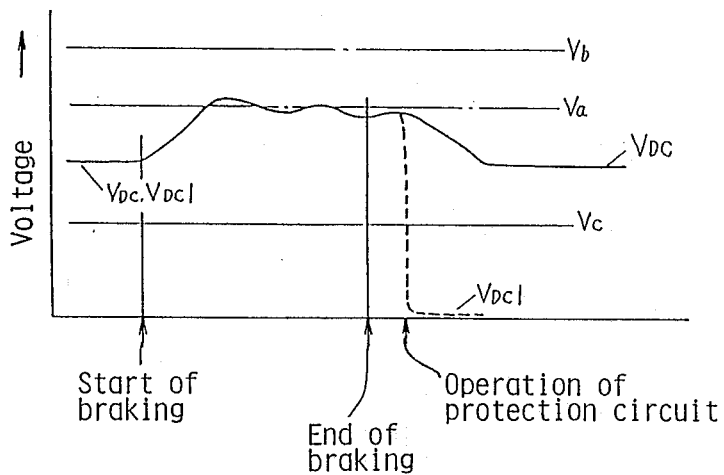
FIG. 5 is an operation explanatory drawing of the control apparatus as shown in FIG. 3.

When the motor turns into braking state, as shown in FIG. 5, $V_{DC}$ rises gradually, and a detected voltage $V_{DC1}$ which has passed the protection circuit (thermal fuse) 8 of the discharge circuit 7 also rises and $V_{DC} \simeq V_{DC1}$. Then, when $V_{DC1} > Va$ is tendered, the regenerative voltage detection circuit 16 composed of a comparator is activated and turns on a switching transistor 21 which is connected in series to the discharge circuit 7 and the protection circuit 8 turns ON, and makes the discharge circuit 7 connected to the smoothing capacitor 3 via the protection circuit 8, thereby making a reduction of the $V_{DC}$. Then, when state of $V_{DC1} > Va$ continues for a long time period, the discharge circuit 7 makes a temperature rise and the protection circuit 8 is activated, and connection of the discharge circuit 7 to the smoothing capacitor 3 is cut out. Consequently $V_{DC1} = 0$ is attained, and the voltage drop detection circuit 20 is activated under the condition of $V_{DC1} < Vc$, and makes the motor driving circuit 4 stop.

INDUSTRIAL APPLICABILITY

As mentioned above, in the present invention, since operation of the motor driving circuit is stopped after operation of the protection circuit of the discharge circuit, the voltage of the smoothing capacitor does not exceed a predetermined set value, and protection of the driving circuit can be heightened.

I claim:

1. A motor control apparatus comprising:
   a rectifier diode connected to an alternating current power source,
   a smoothing capacitor for smoothing an output of said rectifier diode,
   a driving circuit for driving a motor by taking a terminal voltage of said smoothing capacitor as an input,
   a regeneration voltage discharge circuit composed of a series circuit of a resistor connected to the input of said driving circuit and a switching element,
   a thermal fuse connected in series to said discharge circuit for detecting the temperature of the discharge circuit,
   a regeneration voltage detection circuit for detecting an input voltage of said driving circuit via said thermal fuse, and when a voltage over a predetermined value is detected, turning ON said switching element to discharge electric charge on said smoothing capacitor to said discharge circuit,
   over-voltage detection circuit which stops the operation of said driving circuit when an input voltage of said driving circuit reaches a predetermined voltage which is higher than a detected voltage in which the regeneration voltage detection circuit is activated, and
   a voltage-drop detection circuit which stops the operation of said driving circuit when said thermal fuse is open,
   a motor control apparatus wherein the regeneration voltage detection circuit, the over-voltage detection circuit and the voltage-drop detection circuit are composed of respective comparators, and one terminal of the input terminals of respective comparators is coupled to an input terminal of the driving circuit via said thermal fuse, and respective predetermined reference voltage sources are coupled to the other terminal of said input terminals of said comparators.

2. A motor control apparatus in accordance with claim 1, wherein
   the input terminals of the regeneration voltage detection circuit, the over-voltage detection circuit and the voltage drop detection circuit are connected to the driving circuit via said thermal fuse.

* * * * *